J. BUTTERWORTH.
CONVERTIBLE MOTOR VEHICLE.
APPLICATION FILED JULY 10, 1914.
1,132,435.
Patented Mar. 16, 1915.
4 SHEETS—SHEET 4.
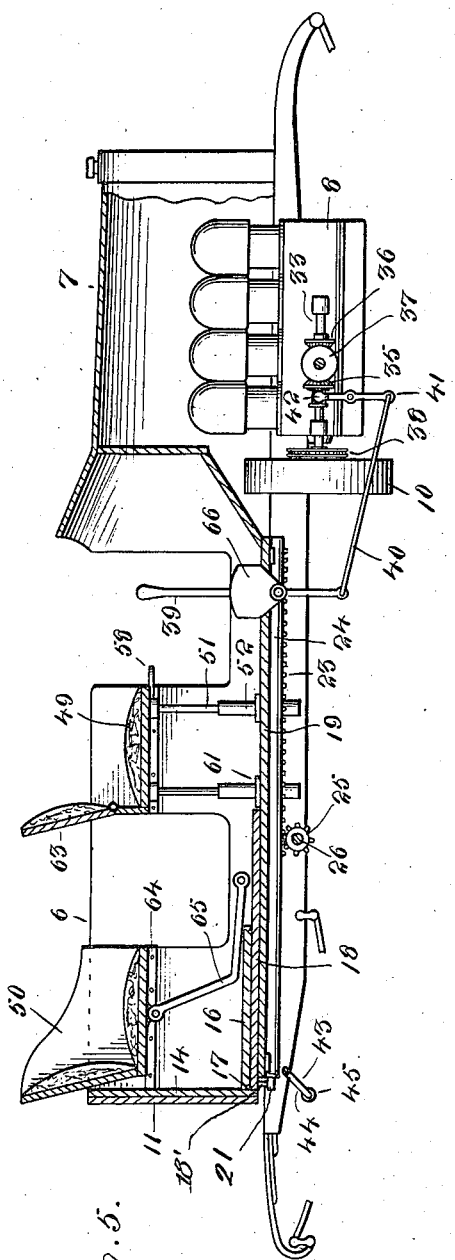
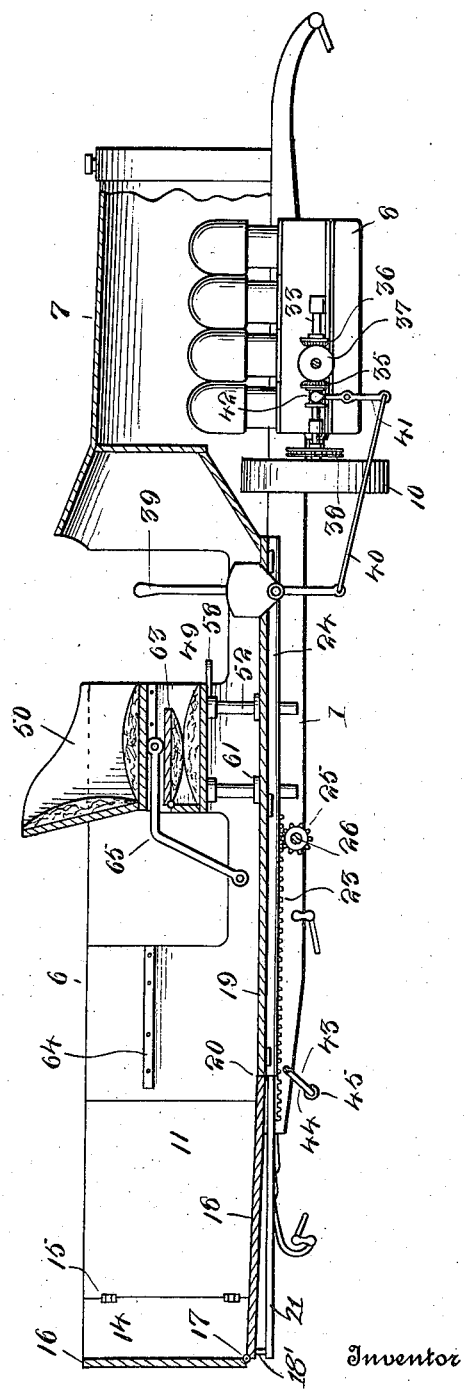
Witnesses
E. R. Ruppert.
P. M. Smith.
Inventor
J. Butterworth
By Victor J. Evans
Attorney

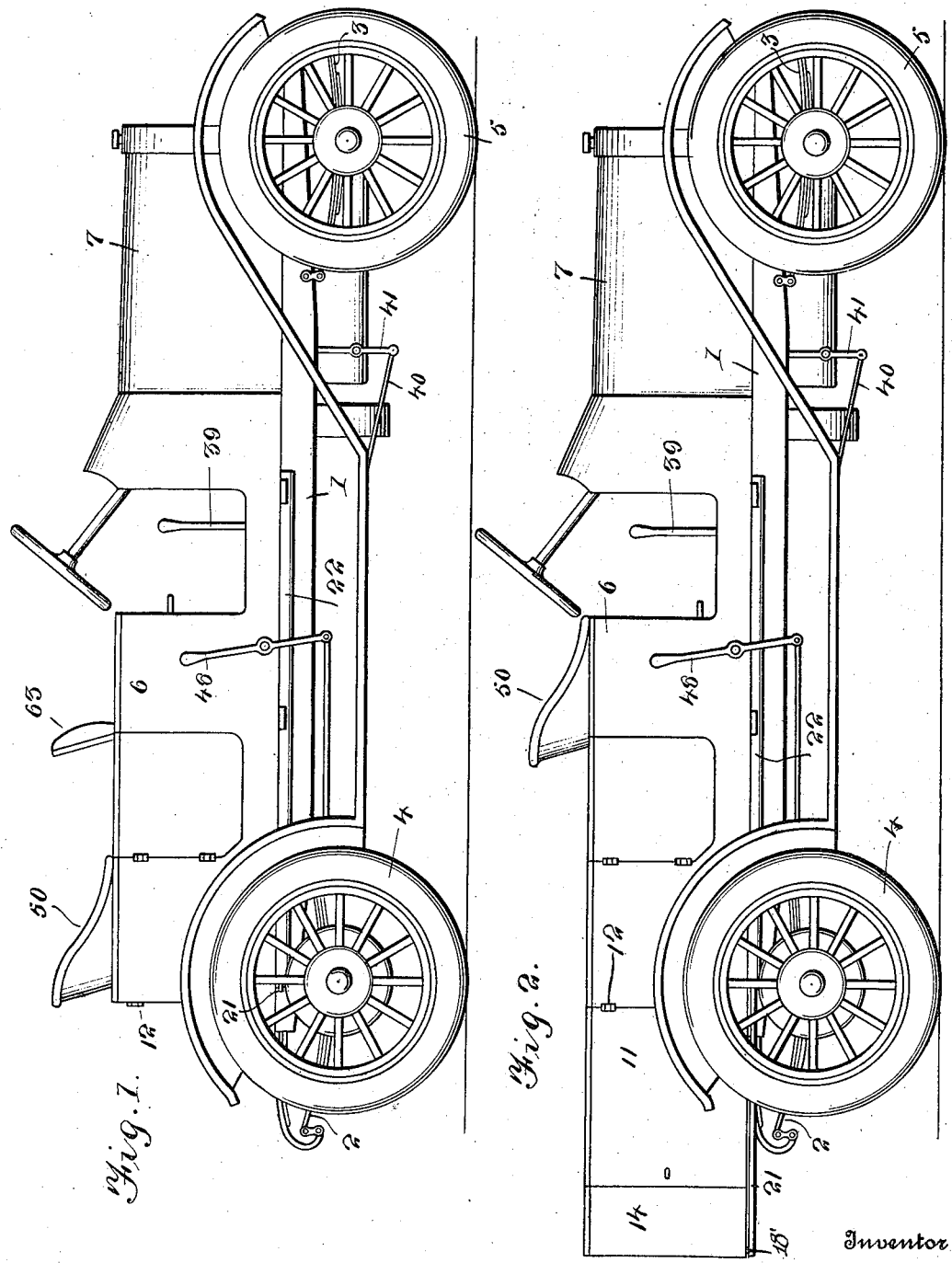

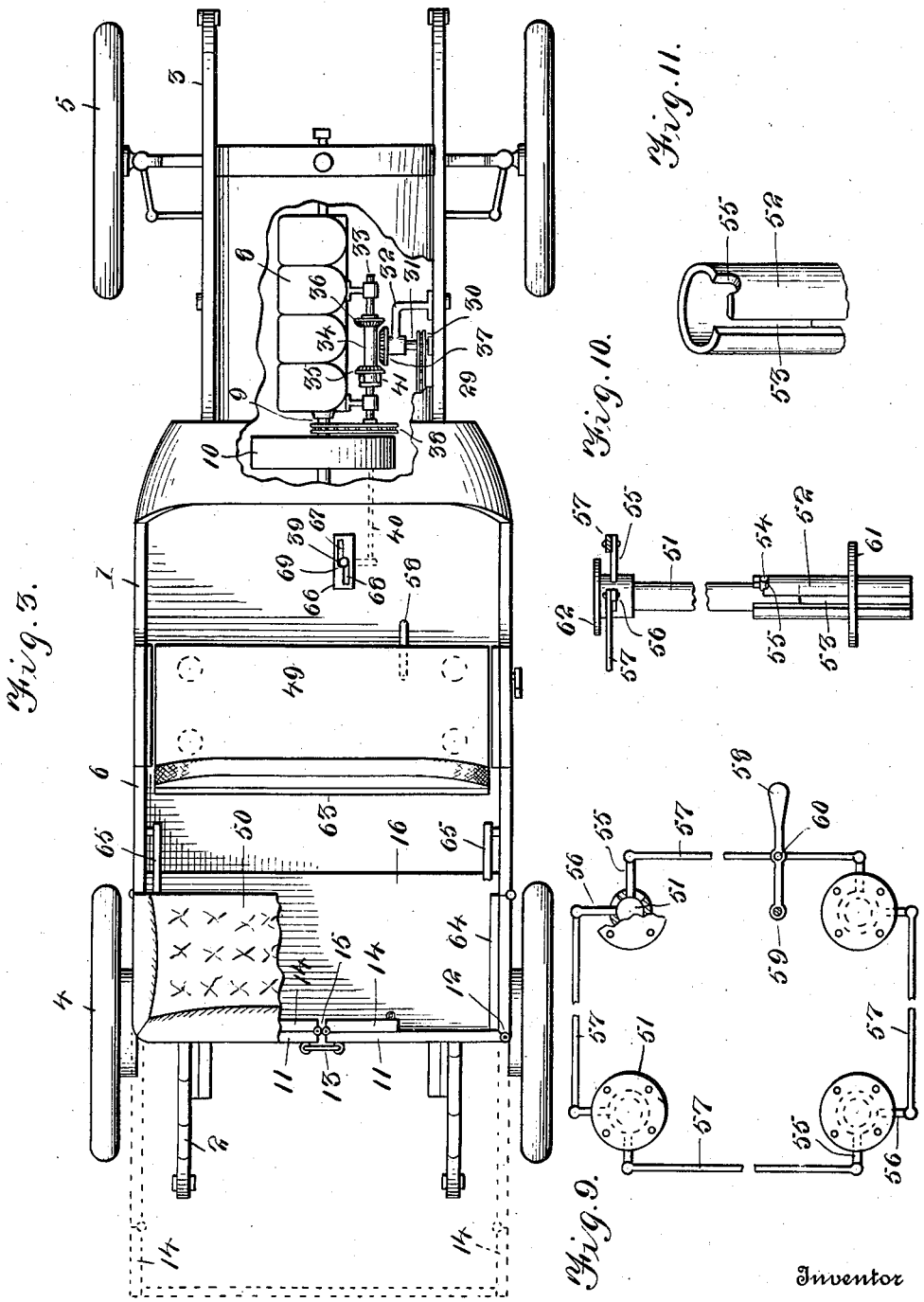

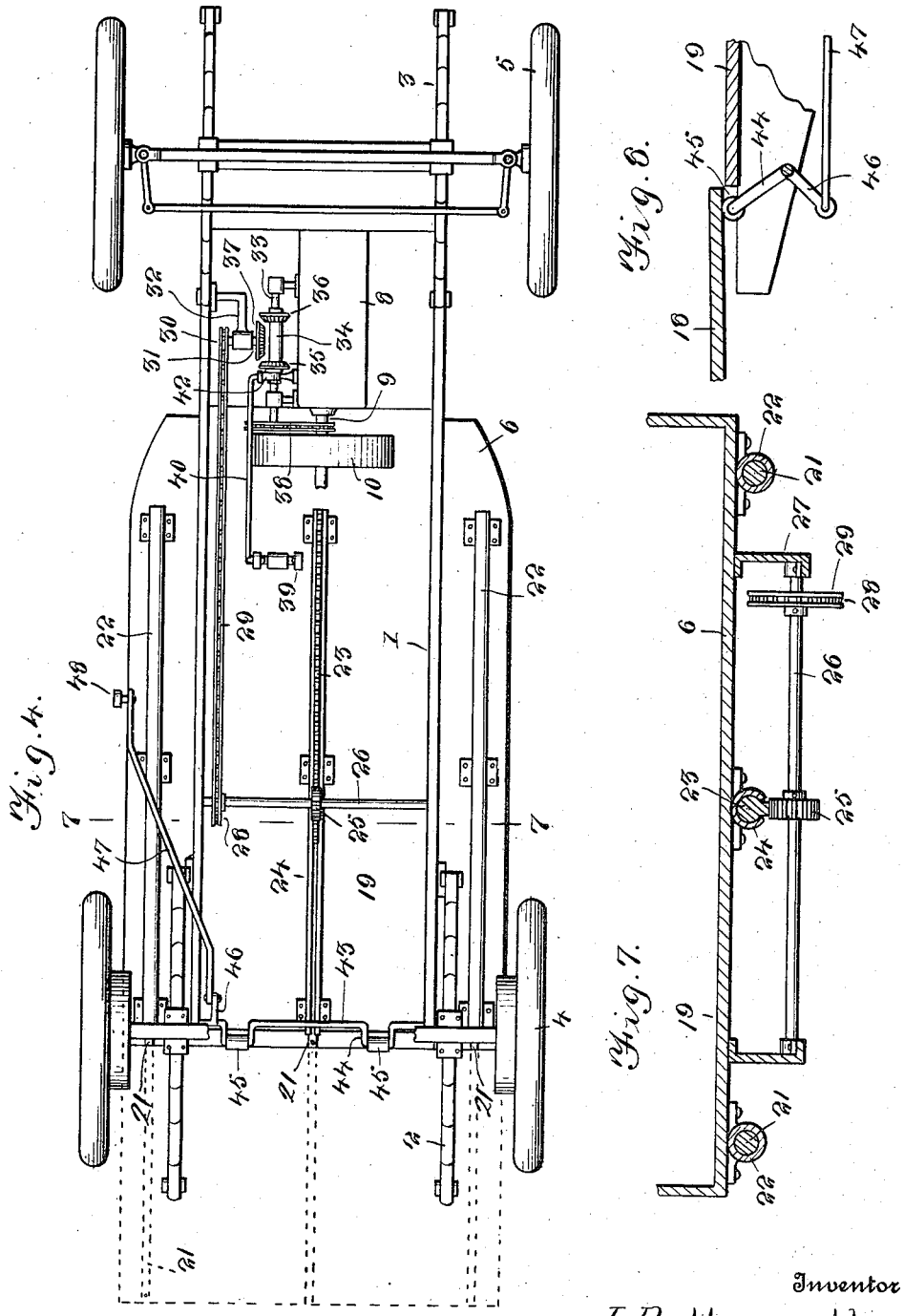

UNITED STATES PATENT OFFICE.

JOSEPH BUTTERWORTH, OF INDIANAPOLIS, INDIANA.

CONVERTIBLE MOTOR-VEHICLE.

1,132,435.  Specification of Letters Patent.  Patented Mar. 16, 1915.

Application filed July 10, 1914. Serial No. 850,231.

*To all whom it may concern:*

Be it known that I, JOSEPH BUTTERWORTH, a citizen of the United States, residing at Indianapolis, in the county of Marion and State of Indiana, have invented new and useful Improvements in Convertible Motor-Vehicles, of which the following is a specification.

This invention relates to convertible motor vehicles, the broad object of the invention being to produce a motor vehicle which may be quickly converted from a passenger or touring car into an automobile truck, adapting one and the same vehicle to be used for both pleasure and business purposes.

One of the principal objects of the present invention is to provide in combination with a stationary or main body, an extension of said body shiftable in a fore and aft direction, combined with motor controlled means for shifting the body extension either in a forward or rearward direction.

A further object of the invention is to provide in combination with such convertible body, a novel arrangement of front and rear seats, the front seat being adapted to be lowered and the rear seat being adapted to be shifted to occupy the normal position of the front seat, when the machine is used as a motor truck.

With the above and other objects in view, the invention consists in the novel construction, combination and arrangement of parts, as will be hereinafter more fully described, illustrated and claimed.

In the accompanying drawings:—Figure 1 is a side elevation showing the machine of this invention arranged as a touring or passenger car. Fig. 2 is a similar view showing the body extended in the form of a motor truck. Fig. 3 is a top plan view partly broken away in section showing the body arranged as in Fig. 1. Fig. 4 is a bottom plan view of the same. Fig. 5 is a longitudinal section through the body of the machine, showing also the engine and part of the body extension shifting mechanism, the body being shown contracted to form a touring or passenger car. Fig. 6 is a similar section showing the body extended. Fig. 7 is a vertical cross section on an enlarged scale on the line 7—7 of Fig. 4. Fig. 8 is a detail vertical longitudinal section showing the means for raising the floor of the extension body. Fig. 9 is a plan view partly in section of the front seat supporting means. Fig. 10 is a detail side elevation of one of the telescopic seat supports. Fig. 11 is an enlarged detail perspective view of the upper end of one of the seat support housing tubes.

Referring to the drawings 1 designates the truck frame or chassis of a combined passenger automobile and motor truck, the same being mounted by means of the usual springs 2 and 3 on the front and rear axles on which are the usual driving wheels 4 and steering wheels 5.

6 designates the main section of the body of the vehicle and 7 the engine hood under which is located the engine conventionally shown at 8, 9 designating the engine shaft and 10 the fly wheel. The back of the main body 6 is formed by two back forming sections 11 which are hinged as shown at 12 to the fixed sides of the main body 6, the sections 11 when arranged as shown in Fig. 3 to form the back of the main body being connected fixedly together by any suitable fastening device shown at 13. When the body is extended in the form of a motor truck as shown in Figs. 2 and 6, the back forming sections 11 extend rearwardly in the plane of the sides of the main body 6 as shown by dotted lines in Fig. 3 and they have hinged to their free edges, end flaps or sections 14, the sections 14 being hinged to the sections 11 as at 15.

16 designates a tail gate which is hinged along its bottom edge at 17 to the extension floor 18 which is slidable upon the main stationary floor 19 and which, when the body is extended, abuts at its forward edge against the rear edge of the stationary floor at the point 20 in Fig. 6. Attached at their rear extremities to the bottom of the extension floor 18 are parallel supporting bars or extension rods 21, said bars being received in tubular guides 22 fastened in fixed relation to the bottom of the main floor 19 as best illustrated in Fig. 7, the bars 21 being adapted to telescope in the guides 22 so as to properly direct the back and forth movements of the extension body when actuated by the means hereinafter described. The tail gate 16 is adapted to be folded in a forward direction so as to lie in parallel relation to and upon the floor section 18 as shown in Fig. 5 and being located under the rear seat, is out of the way.

The means for shifting the extension of the body back and forth longitudinally of the frame comprises a rack bar 23 attached at its rear end to the extension floor 18 as shown in Fig. 6, said rack bar being adapted to slide and telescope within a tubular rack bar guide 24 secured to the bottom of the floor 19 of the main body. Meshing with the rack bar 23 is a pinion 25 fast on a cross shaft 26 journaled at its opposite ends in brackets or hangers 27 on the bottom of the body. Fast on the pinion shaft 26 is a sprocket wheel 28 around which passes a chain 29 which extends forwardly around a driving sprocket wheel 30 on a short transverse shaft 31 journaled in a bracket or hanger 32 fastened to the frame as shown in Fig. 4. Extending parallel to the engine shaft 9 is a side shaft 33 on which is a slidable reversing gear sleeve 34 carrying two bevel pinions 35 and 36 either one of which is adapted to be moved into mesh with another bevel gear wheel 37 on the transverse shaft 31. The sleeve 34 is feathered to the shaft 33 so as to rotate therewith and the shaft 33 is driven from the engine shaft 9 by means of the sprocket gearing indicated at 38. The shaft 33 is thus constantly driven by the engine shaft and motion is imparted to the shaft 31 for shifting the extension body back and forth by moving one or the other of the gears 35 and 36 into mesh with the gear 37. The shifting of the sleeve 34 is effected by means of a manually controlled lever 39 arranged within convenient reach of the operator, a connecting rod 40 extending from the lever 39 to a gear sleeve shifting lever 41 provided with a fork 42 which engages a grooved collar at one end of the sleeve 34. The operator by moving the lever 39 may thus cause the motor to shift the body extension either in a forward or rearward direction as required. The rear edge of the floor section 18 is supported at a slightly higher elevation than the front edge thereof, being pivotally sustained at its rear edge by short posts or lugs 18' on the rear ends of the bars 21 and 23.

When the body is extended as shown in Fig. 6, the forward edge of the floor section 18 is in line with and abuts against the rear edge of the floor section 19, the rear edge of the floor section 18 being high enough to pass over the section 19. Before the extention body may be shifted in a forward direction, it is necessary to raise the forward edge of the floor section 18 at the point 20 as high as the rear edge thereof so it will pass over the rear edge of the floor section 19. This is accomplished by a jack shaft 43 which is shown in the form of a crank shaft, the same being journaled in suitable bearings on the frame of the machine and being provided with one or more elevating cranks 44 preferably provided with anti-friction rollers 45 which are adapted to exert an upward pressure against the bottom of the floor section 18 for the purpose stated. The jack shaft 43 is provided with a lever arm 46 from which a connecting rod 47 extends to a manually controlled lever 48 shown as located at one side of the machine. The operation of the jack shaft is illustrated in the detail section, Fig. 8, wherein the extention floor section 18 is shown as raised at its forward edge and ready to slide in a forward direction upon the stationary floor section 19. When the floor sections 18 and 19 are in the relation illustrated in the last named figure, the shifting mechanism controlled by the engine may be thrown into operation to propel the extension in a forward direction or from the position illustrated in Fig. 6 to the position illustrated in Fig. 5. When the extension of the body is propelled in the opposite direction, the front edge of the floor section 18 drops behind the floor section 19 and into alinement therewith as shown in Fig. 6.

The front seat is represented at 49 and the rear seat at 50, the said front and rear seats being arranged in the same manner as the corresponding seats of the present day touring or passenger car. The front seat 49 is adapted to be raised and lowered and for that purpose is mounted upon a series of seat supports or posts 51, four of such posts or supports being illustrated in Figs. 3 and 9. Each of the posts 51 is arranged to slide telescopically into a housing tube 52 secured in fixed relation to the floor of the vehicle and provided with a longitudinal slot 53 along which is movable a stop 54 shown in the form of a pin projecting laterally from the post or support 51. At its upper end the housing tube 52 is provided with a drop notch 55 into which the stop 54 is adapted to drop to hold the seat support 51 elevated and also prevent axial rotation thereof which would permit the stop 54 to enter the slot 53. All of the supports or posts 51 are adapted to be simultaneously turned by means of lever arms 55 and 56 extending laterally therefrom and all coupled together by connecting rods 57 as shown in Fig. 9, 58 designating a hand lever pivoted at 59 to the seat frame and connected at 60 to the forward connecting rod 57 so that the operator by moving the lever 58 in the proper direction may turn all of the posts or supports 51 and either lock the same in their raised positions or lower said posts, the stops 54 passing downwardly along the slots 53. Each housing tube 52 is shown as provided with a flange 61 to secure the same to the floor of the vehicle and each post 51 is shown as provided at its upper extremity with a cap flange 62 to which the seat frame may be firmly fastened. The front seat is provided with a hinged and folding back 63 which may be turned downwardly from the position shown in Fig. 5 to the position shown in Fig. 6.

The rear seat 50 is shiftable in a fore and aft direction and when in its normal position it is supported by cleats or rests 64 fastened to the inside of the body 6 as shown in Figs. 5 and 6. Said rear seat is connected by pivotal links 65 to the main body section as shown in the last named figures, said links being of such form and length as to direct the rear seat from the position shown in Fig. 5 to the position shown in Fig. 6 and vice versa. Before shifting the rear seat in a forward direction, the front seat 49 is lowered and the back 63 thereof folded downwardly. Then the rear seat is shifted in a forward direction where it rests upon the lowered front seat as shown in Fig. 6 and occupies the normal position of the front seat. This gets the rear seat out of the way when the body is extended in the form of a motor truck and it requires but a moment to lower the front seat and shift the rear seat in the way indicated.

66 designates a guide plate for the reversing lever 39, the same being shown in Fig. 3 and comprising the two slots 67 and 68 offset from each other and connected by the transverse portion 69 which is the neutral point, at which the reversing sleeve 34 is held in such position as to throw both of the bevel gear wheels 35 and 36 out of driving mesh with the bevel gear wheel 37.

From the foregoing description it will now be seen that the machine is readily convertible from a touring or passenger car into a motor truck and vice versa and that while the usual seats are provided for use as a touring or passenger car, one of said seats is made to disappear and the other to take its place when the machine is converted into a motor truck. It will also be understood that the motor is used as the actuating means for shifting the extension of the body either in a forward or rearward direction, such shifting mechanism being under the direct control of the operator while in his seat in the machine. One vehicle thus answers the purpose of two, enabling the owner to operate the car during the week as a motor truck for business purposes and on Sunday as a passenger car.

What I claim is:—

1. In a convertible motor vehicle, the combination of a wheeled frame, a body comprising a non-shiftable section and a shiftable section adapted to form an extension thereof, motor actuated means for shifting said extension section, and means for elevating the forward edge of the floor of the extensible section out of the horizontal plane of the floor of the non-shiftable section.

2. In a convertible motor vehicle, the combination of a wheeled frame, a body comprising a non-shiftable section and a shiftable section adapted to form an extension thereof, motor actuated means for shifting said extension section, and means for elevating the forward edge of the floor of the extensible section out of the horizontal plane of the floor of the non-shiftable section, said elevating means including a jack shaft working against the bottom of the floor of the extensible section, and a manually controlled lever for operating said jack shaft.

3. In a convertible motor vehicle, the combination of a wheeled truck frame, a body comprising a stationary section and a movable extension section, motor-actuated means for shifting said extension section, a front seat, telescopic legs permitting said seat to be lowered, and a rear jump seat adapted to cover the lowered front seat and rest thereon.

In testimony whereof I affix my signature in presence of two witnesses.

JOSEPH BUTTERWORTH.

Witnesses:
 FRED VALLANDINGHAM,
 CATHARINE TINSLEY.